United States Patent [19]

Frame et al.

[11] Patent Number: 4,590,520
[45] Date of Patent: May 20, 1986

[54] METHOD AND APPARATUS FOR DETECTING AND FILLING-IN DEAD SPOTS OF VIDEO SIGNALS FROM AN IMAGE SENSOR

[75] Inventors: Wayne W. Frame, Longmont; Robert E. Trumbull, Boulder, both of Colo.

[73] Assignee: Ball Corporation, Muncie, Ind.

[21] Appl. No.: 555,509

[22] Filed: Nov. 28, 1983

[51] Int. Cl.⁴ .............................................. H04N 5/14
[52] U.S. Cl. ...................................... 358/163; 358/213
[58] Field of Search ............... 358/163, 162, 213, 212, 358/280, 294, 293

[56] References Cited

U.S. PATENT DOCUMENTS

| 4,193,093 | 3/1980 | St. Clair | 358/213 |
| 4,253,120 | 2/1981 | Levine | 358/163 |
| 4,343,021 | 8/1982 | Frame | 358/163 |
| 4,376,289 | 3/1983 | Reitmeier et al. | 358/163 |
| 4,399,464 | 8/1983 | Hix et al. | 358/213 |

Primary Examiner—James J. Groody
Assistant Examiner—David E. Harvey
Attorney, Agent, or Firm—Gilbert E. Alberding

[57] ABSTRACT

Dead spots within an array of photo-sensitive video signal generation elements are detected based on an excessive rate-of-change in sequentially-accessed pre-stored digital sensitivity correction coefficients corresponding to the array of photosensitive elements. The coefficients are sequentially accessed for use in making synchronous real-time sensitivity corrections to the non-dead video output from corresponding ones of the sensor elements. In response to such detected dead spots, an artificial video signal is also substituted during any dead spot so as to "fill-in" the "missing" portions of the video signal otherwise present due to dead spots in the array of video signal generating elements. In the exemplary embodiment, the leading and trailing edge of such dead spots is detected by comparing arithmetic differences between successive correction coefficients to a predetermined threshold value. The synthetic video signal to be substituted during the "fill-in" period may simply be a continuation of the last valid video signal value (e.g., as maintained by an enabled sample-and-hold circuit) or it may involve a local average of pixel values in the immediate vicinity of the pixel(s) being filled-in or a global average of pixel values taken from a major portion of the entire frame of video signals being processed.

19 Claims, 5 Drawing Figures

METHOD AND APPARATUS FOR DETECTING AND FILLING-IN DEAD SPOTS OF VIDEO SIGNALS FROM AN IMAGE SENSOR

This invention is generally directed to method and apparatus for detecting and filling-in video signal "dead spots" resulting from defects in elements of an array of photo-sensitive elements which are substantially insensitive to substantially all levels of incident illumination.

This invention constitutes an improvement to the Image Sensor Sensitivity Variation Compensator described in commonly assigned issued U.S. Pat. No. 4,343,021. In the preferred exemplary embodiment, the present invention may be utilized as an "add on" to the system described in this earlier related and issued patent.

It is by now recognized that it is virtually impossible to produce production line quality video image sensors without defects of one sort or another in at least some of the typical array of numerous photo-sensitive elements used to constitute the image sensor. Although rigid quality control techniques may be used to minimize such defects, there are nevertheless many applications in which even relatively small defects in the image sensor may limit the overall performance of the system in question. For example, where automatic video tracking applications are involved and/or where relatively low constrast images are to be processed (either visually by humans or by video processing/tracking circuits) then even relatively small blemishes in the video image sensor may be of relatively large concern. And, in any event, production quality control techniques required to minimize such blemishes may represent a significant manufacturing cost that could be reduced if techniques are successfully employed for detecting and compensating defects in the image sensor.

The above-referenced earlier U.S. Pat. No. 4,343,021 describes a Shading/Large Area Blemish (SLAB) processor which compensates quite well for of variations in photo-sensitivity of the various pixel-elements in an array of photo-sensitive elements used as the image sensor. In brief summary, this existing SLAB processor first operates in a "calibration" mode, with a uniform illumination input to the entire array of photo-sensitive elements, so as to measure the effective input illumination level versus electrical output level gain (e.g., the absolute value of gain at some predetermined point plus slope information related to the gain curve for that particular element passing through that particular point) for each given "pixel" on a vidicon or other light sensitive element of a typical video camera. Resulting digital correction coefficients (e.g., seven or eight bits) are then calculated (e.g., in an iterative process) and stored away in a digital memory for subsequent use during a normal "run" mode. During normal "run" mode operation, the raw real-time incoming video signal from the sensor array is synchronously modified in accordance with the appropriate pre-calculated and pre-stored digital correction factor so as to result in a processed video output signal compensated for shading and/or large area blemishes of any type which normally causes some variation in the effective gain (i.e., sensitivity) of each elemental light sensitive area in the image sensor. In the existing SLAB processor (as described in U.S. Pat. No. 4,343,021), the succession of pre-stored digital correction coefficients are successively transferred from the memory to a digital/analog converter and used in an analog video multiplier to effect the necessary gain correction.

While such compensation of inter-element sensitivity variations is quite effective over a considerable range of values, it typically cannot be expected to correct the video output for sensor elements that are totally insensitive to incident illumination levels (or at least substantially so). Such "dead spots" do typically exist in virtually all sensor arrays albeit they are usually of somewhat smaller area than the shading/large area blemishes associated with the sensitivity compensation afforded by the existing SLAB processor. Stated somewhat differently, since such "dead" spots or points (or rings or holes or any other geometrical shape) comprise sensor elements that are totally (or at least substantially) insensitive to incident illumination, the raw video signal produced from such elements will always have a substantially constant value—even after they are "corrected" by the pre-stored digital correction coefficients or the like. Of course, to the extent that the "pixel" areas being corrected by the earlier SLAB processor are larger in extent than the dead spots, such dead spots may be of lesser importance since the raw video output for that larger area "pixel" will still inherently include some component that is sensitive to variations in incident illumination and thus subject to at least some compensation by the SLAB type of processor. However, as pixel areas are reduced in size to the order of or less than the areas of expected dead spots, then the "dead spot" problem becomes more severe. And this is especially so where automatic tracking circuits are used to analyze the video signals.

Raster scanned image sensors such as vidicons, image isocons, etc., all can be expected to have small blemishes that are totally insensitive to input radiation (i.e., "dead spot"). Clocked readout of solid state sensors such as linear or arrayed CCD's also exhibit the phenomenon of "dead" pixels. For example, a silicon diode array vidicon may have one or more shorted diodes in its matrix which result in a white spot defect—or one or more open diodes which yields a black spot defect (either of which produce substantially constant outputs substantially insensitive to incident illumination). As a further example, even though an image isocon is typically fabricated under "clean room" conditions and procedures, a certain amount of "debris" is nevertheless typically included inside the tube envelope. When a microparticle falls upon the photo-integration target, an insensitive (e.g., black) dead spot results.

One type of video camera product now available permits a dead spot extending up to ten lines in the vertical dimension (typically corresponding to 2% of the frame height). Such cameras are sometimes used to record take-offs and landings on aircraft carriers and/or may be included as part of a landing aid system which automatically tracks an incoming aircraft so as to provide information feedback to the pilot concerning the rate of descent or glide slope (or the necessary correction thereto) during a landing process. Due to other operating constraints placed upon the system, such an intensified isocon camera may also have an extensive shading characteristic which could be beneficially compensated by the earlier-described and existing SLAB processor. However, the dead spot blemishes inherently also present in such an isocon camera may present special problems to any automatic video tracking equipment such as that which might be used in the landing aid system briefly described above.

The present invention addresses such "dead spot" problems in the output of a video image sensor. The present invention provides method and apparatus for automatically detecting such dead spots and for automatically substituting a synthesized approximately correct video signal which "fills in" the dead spot. The present invention is intended for typical usage with the SLAB processor (or other processors of that general type) so as to provide a fully processed video camera output with corrected large area blemishes as well as filled-in dead spot defects. As such, the resulting fully processed video signal is believed to have increased utility either when displayed for manual visual processing or when used as the input to automatic tracking circuits or the like. In addition to enhanced system performance, it may also be useful, in some applications, to permit some relaxation in the permitted manufacturing tolerances for image sensors.

The general problem of compensating for blemishes in image sensors has also been recognized by others in the prior art. Although it is not known whether other more pertinent prior art may exist, attention is drawn to the following collection of prior issued patents:

U.S. Pat. No. 3,869,567—Covington (1975)
U.S. Pat. No. 4,193,093—St. Clair (1980)
U.S. Pat. No. 4,237,488—Takemura (1980)
U.S. Pat. No. 2,965,711—James et al (1960)
U.S. Pat. No. 4,285,004—Morrison et al (1981)
U.S. Pat. No. 4,288,817—Igel (1981)
U.S. Pat. No. 4,298,887—Rode (1981)
U.S. Pat. No. 4,309,723—Ryan (1982)
Japanese Pat. No. 54-144807—Ricoh (1979)

Covington appears to manually detect the existence of a spot blemish and then to adjust switch settings on hardwired circuity so as to substitute an approximated video signal during the portion of the raster scan that would otherwise have been derived from the spot blemish.

St. Clair seems to improve upon Covington at least by eliminating the requirement for manual detection of the spot blemish locations and/or the manual adjustment of hardwired circuitry. Rather, St. Clair compares the raw video with a threshold value derived from nearby normal raw video signals. Any saturated video signal level thus detected causes operation of a video switch mechanism which substitutes the just previous video signal level for the duration of the thus detected defective saturated video signal level. However, under normally expected complex scene conditions, it would be difficult if not impossible to successfully differentiate between spot blemishes and valid scene detail thus providing only compromised overall performance results for this technique.

Takemura utilizes a separate dedicated memory and attendant control circuitry which has its own special calibration mode during which the X,Y coordinates of spot blemishes are detected. Thereafter, Takemura uses a pixel counting and switch driving technique similar to that of Covington so as to substitute approximated synthesized video signal levels for the video signal segment which would otherwise have been produced by the spot blemish area of the image sensor. At columns 4-5, Takemura appears to suggest that the substituted video signal level might be based upon near neighbor pixel values taken from the just preceding raster scan line. However, since a dead spot may be several scan lines in vertical dimension, the one like delay suggested by Takemura may not suffice except for blemishes that are no more than about one pixel in vertical dimension.

The remaining of the above-listed prior art references are believed generally relevant because they appear to be directed towards compensation for shading or other larger area blemishes.

Now, however, we have discovered a new and improved technique for detecting dead spots by simply processing the already existing and pre-recorded digital correction coefficients associated with an existing SLAB type processor (or any other similar processors utilizing a digital memory containing stored signals representing an array of pre-stored digital sensitivity correction coefficients corresponding to an array of photo-sensitive elements and sequentially accessed for use in making sensitivity corrections to the output signal of such elements).

In particular, if a dead spot comprises or is included as a material part of a pixel sized sensor element, then the corresponding pre-stored and calculated digital sensitivity correction coefficient will be much different in value from its nearest neighbors. Accordingly, the existence of a dead spot defect can be detected based upon a detected excessive rate-of-change in the sequentially accessed correction coefficients of the SLAB processor (or its equivalent). Such excessive rates-of-change in the succession of correction coefficients are, in the preferred embodiment, simply detected by comparing neighboring coefficients. When the difference first exceeds a predetermined threshold value, a "fill-in enabling signal" is initiated. It is then maintained until there is a subsequent change in sign in the calculated difference between neighboring correction coefficients. Such a sign change signals the trailing edge of the detected dead spot and is used to terminate the fill-in enabling signal. Pulse stretching and/or other signal timing techniques may be employed to ensure that the fill-in enabling signal successfully brackets the full time occurrence of any such deteted dead spot (including its leading and/or trailing vestiges). Furthermore, suitable signal timing can be used for accessing and/or using the succession of digital correction coefficients so as to ensure that the fill-in enabling signal correctly occurs in real time synchronization with the occurrence of the dead spot to be filled.

Once such a dead spot has been detected, then the video signal otherwise occurring during the dead spot is "filled-in" with a synthesized approximate signal value. In the preferred exemplary embodiment, the just preceding video signal value is simply maintained (e.g. by a sample-and-hold circuit). Other exemplary embodiments utilize a "local" or more "global" average of valid video signal values to synthesize the substituted video signal.

As might be appreciated, if the presently preferred exemplary sample-and-hold substitution technique is utilized, then there may be some difficulty at the extreme left-hand edge of each line of the raster scan. Although it is possible to employ other video signal synthesizing techniques at the extreme left-hand edge of the video raster scan so as to avoid this potential problem, the presently preferred exemplary embodiment takes a somewhat simplified approach and simply inhibits operation of the dead spot detector (and/or of the fill-in processor) for the first few pixels (e.g., four) of each line of the raster scan. Similarly, since the first few lines of a raster field scan may be imprecisely defined (due to imprecision in location of the vertical blanking interval), the presently preferred exemplary embodiment takes a somewhat simplified approach and simply also inhibits the dead spot detector and/or the fill-in processor) during the first few (e.g., three) lines of each raster scanned frame field in the video signals being processed.

Thus, in the presently preferred exemplary embodiment, there is, in effect, a fairly narrow left-hand and top margin of each video frame that is simply not processed for spot defects. However, in actual practice, this is not believed to present any real practical problem for most applications because the useful field of view typically does not extend to the extreme edges of the video frame. And, it is somewhat simpler and cheaper to implement this simplified inhibition approach. Of course, if a particular application demands operation even in the rather narrow left-hand and/or top margin areas of an image, then those skilled in the art may wish to add additional circuits to ensure processing of these marginal areas.

None of the above-listed prior art references appear to suggest detection of dead spots by analyzing an array of previously calculated and pre-recorded sensitivity correction coefficients (typically generated so as to correct for more gradual shading or other larger area blemishes). However, since the existing SLAB type of processor already includes high speed memory and control circuitry for storing such correction coefficients, and since, as how discovered, it is possible to detect the location and extent of dead spots and to correct therefore in real-time using, in part, this already existing facility, our novel approach to dead spot detection/fill-in represents a considerable cost, power and size savings.

In addition to the savings associated with the already existing digital memory (and its contents of pre-stored digital correction coefficients), our novel dead spot detection technique is invariant to the instantaneous complex scene information inherently included in the typical raw video output during the "run" mode. Furthermore, our novel technique does not require special or additional calibration sequences or routines, other than that already employed during the "calibrate" mode used by the pre-existing SLAB type processor. The resulting improvement provides both sensitivity and dead spot fill-in compensation functions with minimal further circuitry/cost requirements over the pre-existing SLAB type processor.

As previously mentioned, the presence and location of dead spots is not easily extracted from real time video signals under real world scene conditions due to the variety and complexity of expected video signal components—not to mention the associated thermal noise components inherently included in all video signals. Typical prior dead spot correction techniques have required specially dedicated memory maps to be generated and stored containing spatial information as well as polarity to permit dead spot fill-in compensation. However, existing SLAB type processor already contains such information within its pre-stored two-dimensional array of digital correction coefficients. This invention utilizes such a pre-stored correction coefficient array to simply detect the presence and location of dead spots by examining the rates-of-change of the coefficient values—with no additional memory requirements—while at the same time providing a detection technique which is invariant with respect to instantaneous real time scene information present in typical raw video signals.

These as well as other objects and advantages of this invention will be better understood by study of the following detailed description of the presently preferred exemplary embodiment of this invention in conjunction with the accompanying drawings, of which:

FIG. 4 is a more detailed schematic diagram of the video fill-in processor depicted in the exemplary embodiment of FIGS. 1 and 2.

Figure 1:
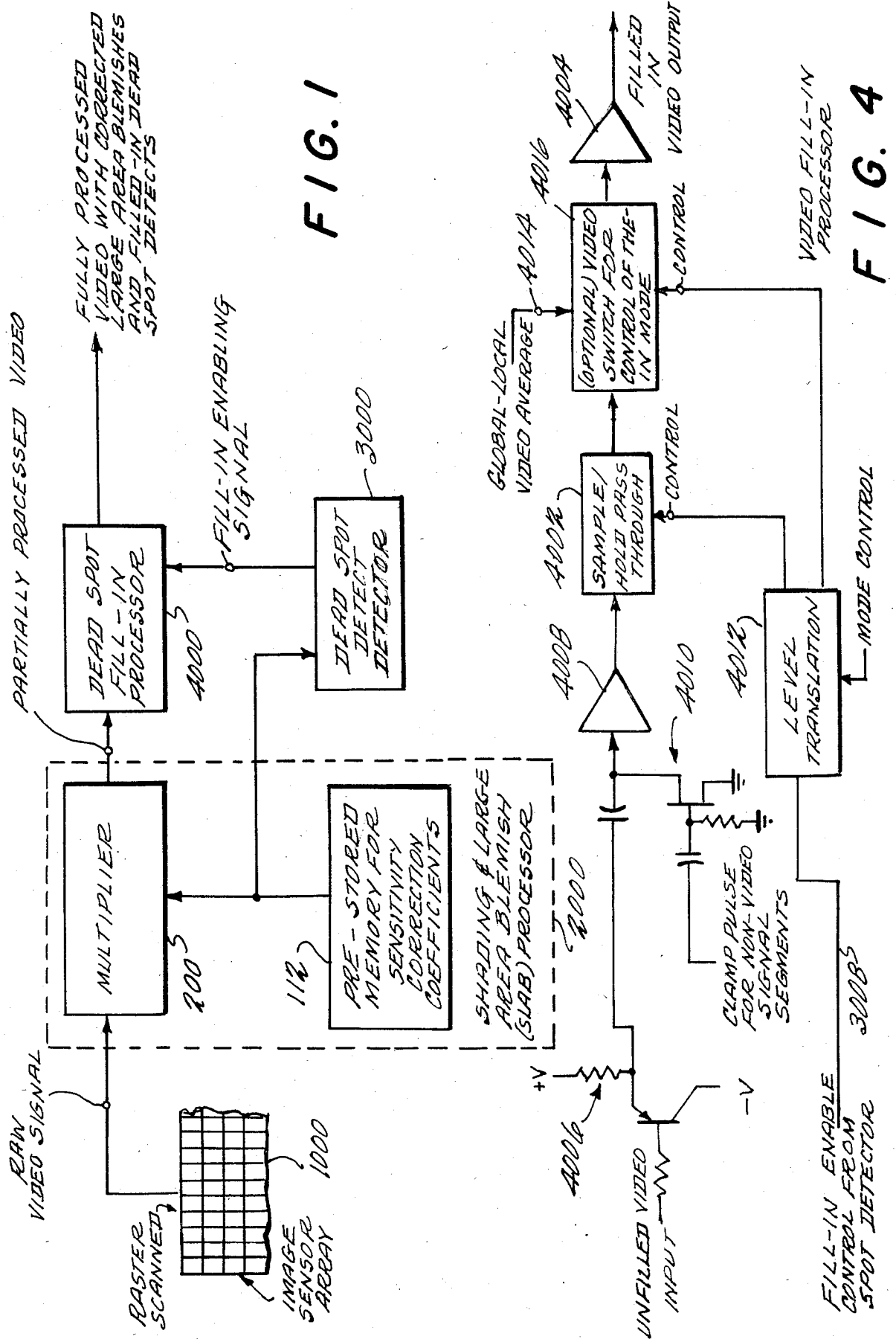
FIG. 1 is a generalized block diagram of a presently preferred exemplary embodiment of apparatus that may be used to practice this invention.

As depicted in FIG. 1, a conventional raster scan image sensor array 1000 provides raw video signals which can be expected to include anomalies due to unavoidable defects in various elements of the photosensitive sensor array 1000. Large area blemishes associated with changes in element sensitivity are compensated by the large area blemish processor 2000 which may be of the type described in earlier U.S. Pat. No. 4,343,021. Such a SLAB process (or its equivalent) includes a pre-stored memory 112 for digital correction coefficients which, for example, may be used in conjunction with a multiplier 200 to provide a partially processed video output. However, as should now be appreciated, such a partially processed video output will still have anomalies due to dead spots which cannot be fully compensated by the SLAB type processor 2000.

In accordance with this invention, the pre-stored memory 112 and its contents of digital correction coefficients is accessed by a dead spot defect detector 3000. Excessive rates-of-change in the succession of accessed digital sensitivity correction coefficients are detected and used to generate a fill-in enabling signal which brackets, in real time, the video signals emanating from dead spots (of either polarity) in the sensor array 1000. A dead spot fill-in processor 4000 then responds to such a fill-in enabling signal to further process the video signal by filling in such dead spots with a synthesized, approximately correct, video signal segment. The result is a fully processed video signal with corrected large area blemishes as well as filled-in dead spot defects as depicted in FIG. 1.

To restate, the SLAB processor (or its equivalent) is used to compensate for non-uniform sensitivity in the light sensitive elements of the sensor array; however, totally dead spots (or substantially dead spots) of the array will still remain uncompensated. By adding a few relatively simple components in the form of the dead spot detector 3000 and the dead spot fill-in processor 4000 to the basic SLAB processor, its functions can be readily expanded to compensate for dead spot defects (either black or white) of at least moderate to small sizes.

The basic SLAB processor already stores a two-dimensional array of correction coefficients having values which contain information as to instantaneous responsivity or sensitivity of the corresponding elements of sensor array 1000. Accordingly, magnitude, polarity and spatial information concerning all elements of the sensor array 1000 are already contained within the stored array of correction coefficient data in the memory 112.

If a black or white dead spot is encountered during the "calibration" cycle of the SLAB processor, the stored correction coefficient will correspond to a terminal (i.e., either maximum or minimum) count or value due to the necessarily finite dynamic range capabilities of the SLAB processor (and due to action of the limiting circuit which prevents the index register from rolling over). If a very small dead spot is encountered (i.e., one of smaller extent than the nominal pixel size), the correction coefficient for the pixel containing this spot may not reach such a terminal (i.e., maximum or minimum) value or count because it will necessarily be convolved with a somewhat larger reading beam which acts to decrease the amplitude of the dead spot (i.e., to make it appear slightly less than entirely "black"). However, the signature of even such a small dead spot may also be detected using this technique due to the reatively rapid rates of change that will nevertheless be observed between neighboring correction coefficients. At present, a digital computation circuitry including a sort of pipeline delay feature is preferred to detect the rapid rates of change in pre-stored correction coefficients corresponding to the onset and cessation of scanned dead spots in the sensor array. However, ultimately an analog circuit approach may offer a lower cost and/or other advantages for some applications.

The detected dead spot information gathered from the pre-stored digital correction coefficient memory is then used to control a video switch in the fill-in processor 4000. The video switch toggles between the real time video signal input to a synthesized video signal level representative of the just previous (or of an average global or local) video signal level. In this way, a dead spot is "filled in" by a signal level that is less perturbing to automatic tracking circuitry which may perceive the filled in area merely as background or as a continuation of an object being tracked (if the image of the object happens to fall on the dead spot).

For "local" fill-in values, the synthesized video signal may merely take on the value of the signal output from the just previous pixel having a "valid" correction coefficient. This is, in fact, the presently preferred exemplary embodiment approach and may be very simply implemented using a track and hold circuit which is itself of conventional design.

However, the synthesized fill-in video signal can also be generated by an integrator. For a global fill-in level, the integrator may have a time constant as long or longer than the duration of an entire video frame. A somewhat shorter time constant (say equal to about 10 vertical line intervals) may allow the fill-in synthesized video level to follow top-to-bottom brightness variations such as may be found when sky and ground scenes are involved and where such top-to-bottom brightness variations as sky/earth are more likely to occur in elevation than in azimuth. It is also possible to provide an operator accessible vernier gain control on such an integrator which allows the operator to adjust or fine tune the synthesized fill-in level at any desired integration time or picture area.

The presently preferred dead spot defect detector 3000 uses a fairly simple digital circuit to examine the on-going correction coefficient stream and to thus locate the edges of dead spot defects by detecting abrupt transitions in the values of such a stream of correction coefficients. In the exemplary embodiment, the instantaneous or current digital coefficient value is subtracted from the just previous coefficient value. The absolute value of such a difference is then compared to a predetermined threshold value. If the threshold is exceeded, a flip-flop is set to initiate the fill-in enabling signal. The flip-flop is then reset by the detected trailing edge of the dead spot defect (which may be simply detected as any subsequent change in sign in the difference value previously mentioned).

As already briefly mentioned, using the presently preferred simplified edge detection technique, the presently preferred exemplary embodiment merely inhibits dead spot detection and/or fill-in at the extreme left-hand margin (and the extreme top margin) of each video frame. If that is not acceptable for some application, then one must properly initialize the dead spot detector 3000 at the beginning of each raster scan line because the correction coefficient associated with the end of the just previous line could be considerably different from that associated with the beginning of the next line—and still not be truly indicative of a dead spot. Of course, if a sufficiently large threshold value is employed, then perhaps the absolute value of the difference even between correction coefficients associated with the end of one line and the beginning of the next line may still be used to indicate dead spots even at the extreme left-hand edge of each scanned line. Alternative approaches are also available for increasing coverage to the extreme left-hand edge of each image frame. For example, one might memorize (e.g., in a simple digital latch) the average coefficient values from one or more pixel locations at the extreme left-hand edge of the just previous line(s) for use in detecting a possible dead spot which begins at the extreme left-hand edge of the raster scan line now being scanned.

Figure 2:
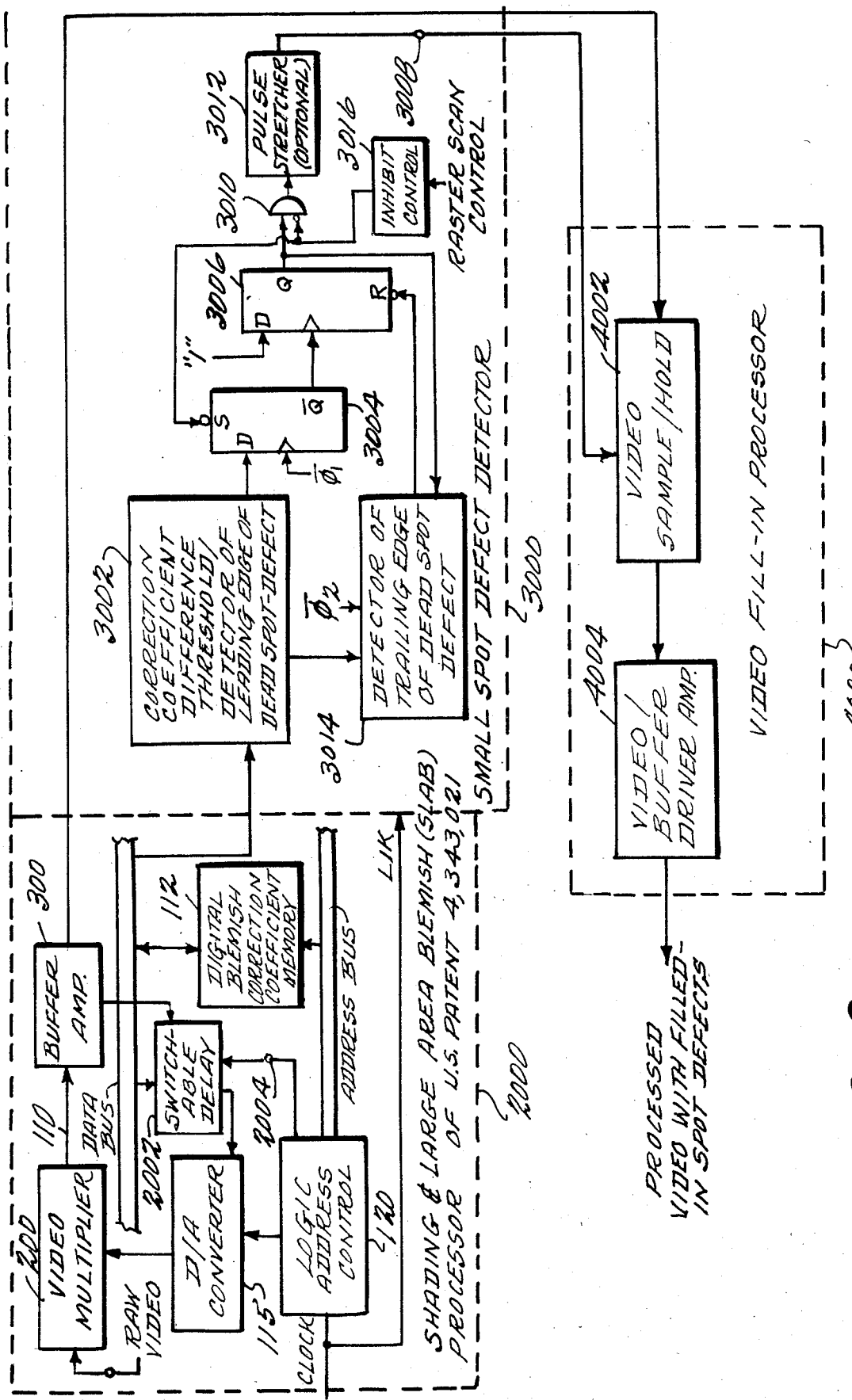
FIG. 2 is a more detailed block diagram of the exemplary embodiment shown in FIG. 1.

Portions of the SLAB processor 2000 are shown in more detail at FIG. 2. However, the FIG. 2 shown in this application is somewhat simplified and leaves out many of the details depicted more explicitly set forth in prior U.S. Pat. No. 4,343,021 the entirety of which is hereby incorporated by reference.

The video multiplier 200, buffer amplifier 300, digital-/analog converter 115, digital blemish correction coefficient memory 112, logic address and control circuit 120 as well as the data/address buses and clock lines depicted in the SLAB processor 2000 at FIG. 2 are all taken directly from prior U.S. Pat. No. 4,343,021 (which uses these same reference numerals for these elements). The only added element in FIG. 2 is a switchable delay circuit 2002 (inserted in series with an 8-bit data flow from the data bus to the digital-to-analog converter 115 used to drive video multiplier 200) and its associated control line 2004 emanating from the logic and address control circuits 120.

The switchable delay 2002 may be switched to an inoperative (i.e., no delay) condition during the "calibration" mode of the SLAB processor. However, since the dead spot defect detector 3000 has about one clock cycle of data processing time associated with its operation (in the exemplary embodiment), an additional one clock cycle of delay is switched in during the "run" mode of the SLAB processor 2000 at switchable delay element 2002 so as to maintain proper time synchronization between the output of the digital-to-analog converter 115 (used to real-time sensitivity compensate the video signals via video multiplier 200) and the real-time fill-in operations of the video fill-in processor 4000 (which is controlled by the spot defect detector 3000 from the same succession of digital correction coefficients appearing on the data bus). As will be appreciated by those in the art, if the dead spot defect detector 3000 is designed so as to have different processing delay times, then appropriate steps may be taken to similarly delay the corrective output of the digital-to-analog converter 115 if real time compensation of the raw video is to occur both in the SLAB processor and in the video fill-in processor. Other timing techniques may also be employed, if desired and as should be apparent to those in the art, to maintain real-time synchronization of all video compensating operations.

At the same time, as those in the art should now appreciate, it will be necessary to *advance* by the same number of clock cycles (e.g., one in the exemplary embodiment) the succession of address signals appearing on the address bus so that the succession of correction coefficients are withdrawn from memory 112 at a point in time that is sufficiently early to permit time synchronization in real time of the compensation processes carried out by the SLAB processor at video multiplier 200 and the video fill-in processor 4000.

Figure 5:
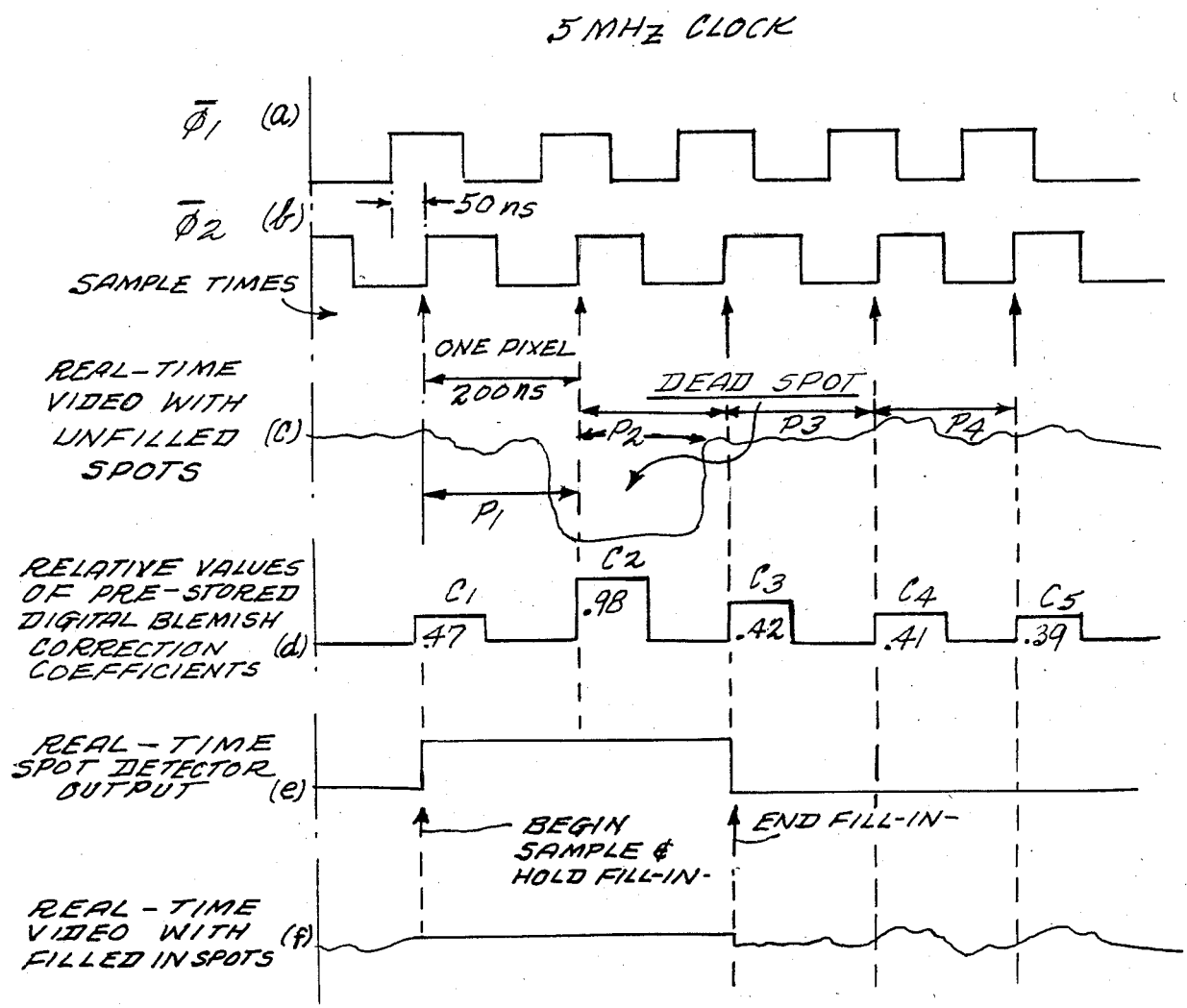
FIG. 5 is a signal/timing diagram useful in explaining and understanding the operation of the exemplary embodiment of apparatus depicted in FIGS. 1-4.

Referring briefly to FIG. 5, it will be seen that the 5 MHz clock utilized in the exemplary embodiment defines nominal pixels corresponding to 200 nanosecond blocks of raster scan time. The clock signals already available in the SLAB processor 2000 include $\phi_1$ (at line (a)) which leads by 90° another clock signal $\phi_2$ (at line (b)). An arbitrary real-time video signal segment has been depicted at line (c) having unfilled dead spots one of which is depicted in FIG. 5.

In accordance with the "calibrate" mode of the SLAB processor already described in U.S. Pat. No. 4,343,021, pre-stored digital sensitivity correction coefficients are stored in memory 112 for each pixel kand these have been schematically illustrated in bar graph format at line (d) on FIG. 5. As will be observed, the pre-stored correction coefficient associated with pixels containing the dead spot are of abnormal values. Since the dead spot does not extend very far into pixel $P_1$, its correction coefficient $C_1$ is only slightly different from the nominal values associated with normal or active pixels $P_3$, $P_4$, and $P_5$ as depicted in FIG. 5. However, since most of pixel $P_2$ is occupied by the dead spot, its correction coefficient $C_2$ is almost at a limit value (e.g., in the example being described it is assumed that correction coefficients have a dynamic range extending from 0 to 1.0).

It should be noted that the schematically depicted correction coefficients at line (d) of FIG. 5 would actually have been fetched from the memory 112 at least one clock cycle earlier than the real time occurrence of the pixel with which they are associated. In this manner, the onset of the dead spot can be detected by the excessive rate of change between coefficients $C_1$ and $C_2$ in sufficient time to actually begin the sample and hold fill-in enabling signal (e.g., as shown in line (e) of FIG. 5) in real-time at the beginning of pixel $P_1$.

The termination of the dead spot is similarly detected by the abrupt transition (in the reverse direction) between coefficients $C_2$ and $C_3$. Here, the termination of the fill-in enabling signal is delayed to occur in real-time at the end of pixel $P_2$ as also depicted in FIG. 5. For the duration of the fill-in enabling signal shown at line (e) of FIG. 5, the read time video signal is switched out and replaced by a synthesized approximately correct video signal. As depicted in line (f) of FIG. 5, the result is a real time video signal with filled in dead spots where, in the exemplary embodiment, the dead spot is filled simply by holding constant the last "valid" video signal level which occurred at the time the fill-in enabling signal was initiated.

The exemplary dead spot defect detector 3000 is shown in somewhat more detail at FIG. 2. Here, as previously described, the recorded sensitivity correction coefficients in memory 112 of the SLAB processor 2000 are made available via a common data bus to a correction coefficient difference/threshold detector 3002 of the leading edge of a dead spot defect. When such a leading edge is detected, then D-type flip-flop 3004 is presented with a "1" input that is clocked by the next clock signal $\bar{\phi}_1$. The Q output of the flip-flop 3004 is then used to clock a second D-type flip-flop 3006 having a constant "1" value signal connected to its D input. The resulting output from flip-flop 3006 then initiates a fill-in enabling signal at line 3008—provided that AND gate 3010 is not inhibited.

The optional pulse stretcher 3012 is assumed, in the exemplary embodiment, to not delay the initial or leading edge of an input. The fill-in enabling signal on line 3008 will then continue in existence until detector 3014 (of the trailing edge of the dead spot defect) operates to reset flip-flop 3006.

The inhibit control circuitry 3016 uses conventionally available inputs from the video raster scanning control circuits to inhibit (e.g., via AND gate 3010 and the set control input of flip-flop 3004 or other equivalent control points) operation of the dead spot defect detector during the extreme left-hand and top marginal portions of each video frame for reasons already explained.

Since the address control circuit 120 of the SLAB processor has been advanced by one clock cycle (and an added one clock cycle delay has been switched into the SLAB processor operation), it will be appreciated that the real time occurrence of the fill-in enabling signal is still in proper real-time synchronization with the video signal being processed by both the SLAB processor and the video fill-in processor 4000. In the exemplary embodiment, the video fill-in processor includes a conventional video sample/hold circuit 4002 which normally merely passes input video signals on through to its output, and to a conventional video buffer/driver amplifier 4004. However, during the existence of the fill-in enabling signal on line 3008, the sample-and-hold circuit 4002 is controlled so as to maintain at its output a constant video level corresponding to the just-previous video signal level input thereto.

Figure 3:
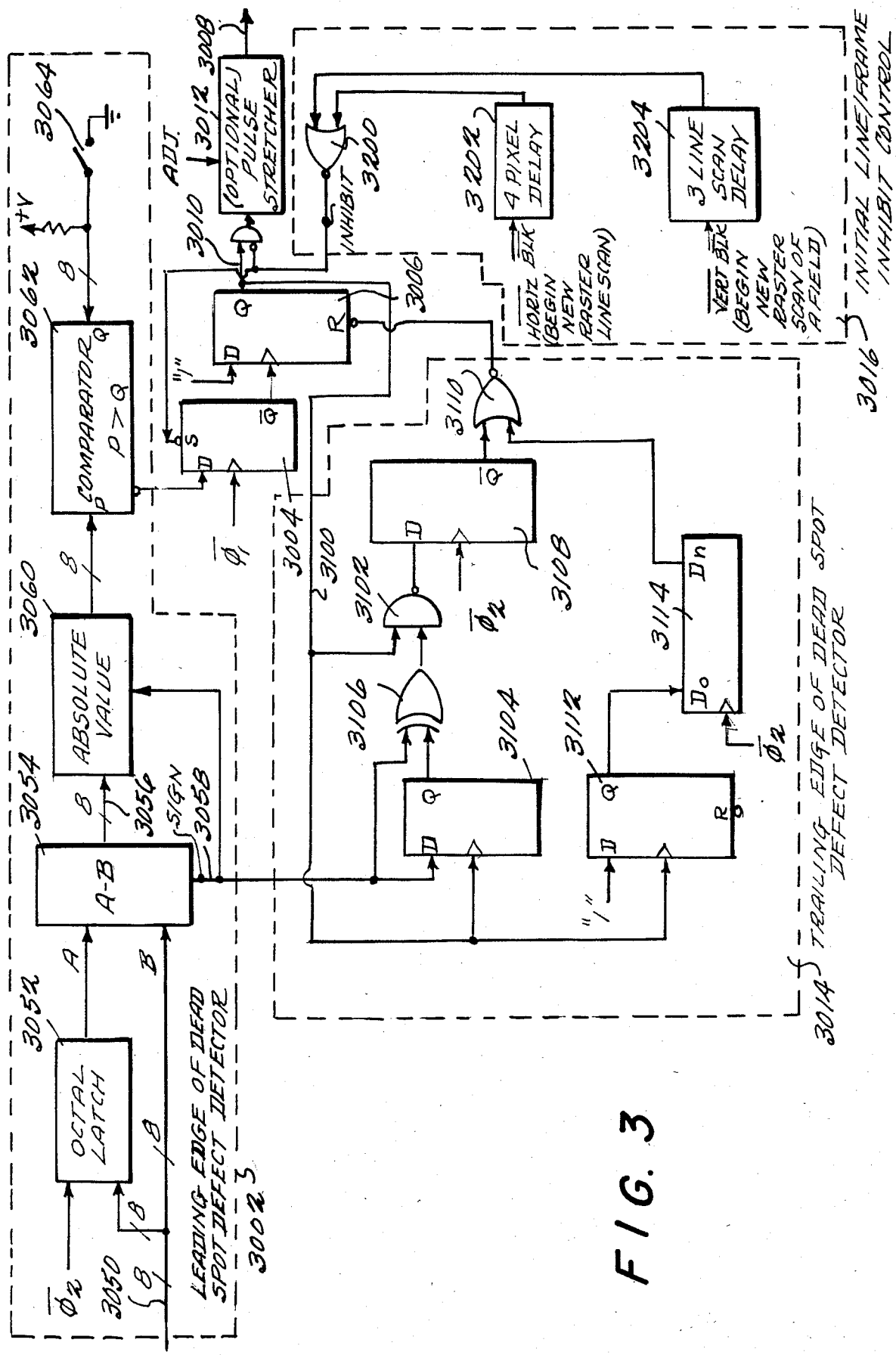
FIG. 3 is a more detailed schematic diagram of the dead spot defect detector depicted in the exemplary embodiment of FIGS. 1 and 2.

A detailed schematic diagram of the digital circuitry employed in the exemplary embodiment of the dead spot defect detector 3000 is shown at FIG. 3. As there depicted, a parallel bit digital signal representing a succession of pre-stored digital sensitivity correction coefficients from memory 112 (as sequentially addressed by the address control 120) appear on lines 3050. A conventional octal latch circuit 3052 (e.g., 74LS273 integrated circuit) is clocked by the second clock signal $\bar{\phi}_2$ so as to, in effect, store and delay digital signals input thereto by one clock cycle. Accordingly, the digital correction coefficient currently appearing on the address bus will be substracted from the just previous occurring correction coefficient in conventional arithmetic circuits 3054 (e.g., comprising a pair of 74S381 adder circuits conventionally connected with a look ahead and carry circuit 74S182) so as to provide the arithmetic result on lines 3056 and, concurrently, to provide the sign of the arithmetic result on a sign line 3058. This sign information is then conventionally used with a conventional array of exclusive OR gates 3060 (e.g., a pair of 74S86 integrated circuits) to provide the absolute value of the difference between neighboring correction coefficients as the P' input to comparator circuit 3062 (e.g., integrated circuit type 74L682). The other or Q input to comparator 3062 may be conventionally provided via a set of manually operated switches 3064 or the like as will be appreciated by those in the art.

Although the value of the predetermined threshold thus defined by switches 3064 may vary considerably from one application to the next, one exemplary embodiment has successfully employed a threshold value corresponding to 0.125 (if it assumed that the dynamic range of correction coefficients extends from 0 to 1.0).

If the thus derived absolute value of the difference between neighboring correction coefficients is greater than the predetermined threshold value, then an output is generated from comparator 3062 to provide a "1" D input to the D-type flip-flop 3004 to trigger the initiation of the fill-in enabling signal on line 3008 as previously described.

The trailing edge dead spot detector 3014 is initialized by the onset of the fill-in enabling signal via line 3100. For example, NAND gate 3102 is enabled and the D-type flip-flop 3104 is clocked to provide, at its Q output, a latched signal indicative of the then existing sign output on line 3058 from the leading edge detector 3002. Whenever the sign output from arithmetic circuits 3054 again changes, exclusive OR gate 3106 will be triggered to provide (via the enabled NAND gate 3102) a "1" input to D-type flip-flop 3108. It will then be clocked upon the next positive-going transition of the second clock signal $\bar{\phi}_2$ to provide, at its Q output, a reset signal (via NOR gate 3110 to flip-flop 3006) thus terminating the fill-in enabling signal.

Other techniques for terminating the fill-in enabling signal may also be used. For example, one could use the next output from threshold comparator 3062 in conjunction with a changed sign signal.

As a safety precaution in the exexmplary embodiment, an extra D-type flip-flop 3112 and a short shift register 3114 have been provided so as to limit the possible extent of the fill-in enabling signal to some fixed number of pixel elements (e.g., eight). Thus, if a fill-in enabling signal is somehow erroneously generated, it will only exist for this maximum period. In particular, the initiation of a fill-in enabling signal will clock flip-flop 3112 to provide a Q output of "1" at the $D_0$ input of the N-stage shift register 3114 which is clocked by second clock signal $\bar{\phi}_2$. When this "1" signal is shifted through to the Nth-stage of shift register 3114, it will also provide a reset to flip-flop 3006 via NOR gate 3110—if that has not already occurred via flip-flops 3104 and 3108 in accordance with the previously described operation.

As depicted in the exemplary embodiment of FIG. 3, the inhibit control circuit 3016 has a 4-pixel delay 3202 triggered by the cessation of each horizontal blanking pulse (i.e., at the beginning of each new raster line scan). This provides an inhibit control signal for AND gate 3010 and for the set input of flip-flop 3004 via NOR gate 3200. Additionally, a 3-line scan delay 3204 is triggered by the cessation of the vertical blanking pulse (i.e., at the beginning of each new raster scan of a field) so as to also provide a similar inhibiting signal via NOR gate 3200. In this fashion, and for reasons already explained, the extreme left-hand margin (e.g., the 4-pixel width on the left-hand side) and the extreme upper margin (e.g., the top three lines of each scan field) are simply not corrected for dead spots.

The optional pulse stretcher 3012 may be employed to provide additional time shifts for the edges of the fill-in enable signal so as to better ensure that it completely brackets, in real time, the termination of a detected dead spot. If the processed video is intended for an automatic tracker system, then the bracketing times may be made more extensive than might be desired for manual visual processing of the displayed video image.

The video fill-in processor 4000 is shown in more detail at FIG. 4. Here, the unfilled video input from the SLAB processor 2000 is conventionally passed on by driver amplifier 4006 to impedance isolating amplifier 4008 (e.g., an emitter follower). A clamping FET circuit 4010 (similar to that used at various points in the SLAB processor described in U.S. Pat. No. 4,343,021 for example at 534 in FIG. 5 of that patent and as described at columns 9-10) is provided so as to clamp out of the video compensation process all synchronizing/control signal components of a normal composite video signal thus ensuring that only the true information carrying or data portion of the video signal is actually subject to the fill-in process.

A conventional video speed sample-and-hold circuit 4002 (e.g., integrated circuit of the type HTS-0025 marketed by Analog Devices) may be employed. If the generated signal levels of the fill-in enabling signal on line 3008 are appropriate, they may be used directly to control this sample and hold circuit 4002. However, as will more typically be required, conventional voltage level translating circuits 4012 may be employed so as to translate the fill-in enable signal to appropriate driving levels for controlling a particular type of sample-and-hold/pass-throught circuit 4002.

If desired, alternate substituted video signal input(s) 4014 (e.g., global or local averages of "normal" video pixel values) may be provided to a video switch 4016—which switch may also be controlled by the fill-in enabling signal via conventional level translation circuits 4012 to substitute the alternate input at 4014 instead of the output of the sample/hold circuit during the dead spot intervals. As will be appreciated, in this event, there may be an additional control input to the level translation circuits 4012 for use in selecting this alternate mode of operation so that the sample and hold circuit 4002 is maintained in its "pass through" mode of operation even during the detected dead spot intervals.

The resultant fully processed video signal is then output via a conventional cable driver/buffer amplifier 4004 to provide processed video having not only compensated large area blemishes but also filled-in dead spot defects.

Since a dead spot may gradually make its appearance over several pixel dimensions, it is preferred to keep the test threshold value as low as possible. This, in turn, means that there may be several successive outputs from comparator 3062 during the leading edge portion of a dead spot. However, as should now be apparent, the exemplary embodiment ignores all but the first such output and instead, uses the next *change* in sign from the arithmetic circuits to detect the trailing edge of the dead spot. Such a sign change will occur whenever the direction of coefficient difference values first changes—i.e. at the onset of the dead spot trailing edge. Since the trailing edge may also be relatively gradual over several pixel dimensions, the optional pulse stretcher 3012 may be employed to extend the trailing edge of the fill-in enabling pulse as earlier described.

The rates-of-change in correction coefficients may also be detected in more complex ways using more than just nearest neighbors in the raster sanning sequence. For example a sliding average or other combination plural coefficients might be compared and thresholded. However since the "dead spot" coefficients may themselves inherently weight such averages, the result may not always be acceptable. For example, we first tried using an average of the last 8 or 16 correction coefficients for a thresholded comparison with the current coefficient. While this appeared to detect leading dead spot edges, it was not deemed successful in detecting trailing edges. And it was more costly and complex to implement.

It should also be noted that the converted analog form of the succession of stored digital correction coefficients (e.g. as already appearing at the output of D/A converter 115) may be used by analog dead spot detector to implement this invention. In that event, one might, for example, eliminate any added digital delay and, instead, incorporate a suitable analog delay in the video channel between the SLAB processor and the dead spot fill-in processor so as to compensate for any processing time of the spot detector and to maintain proper real-time synchronism between the video signal and its compensation processing. (This latter alternate timing approach might also be used for the presently preferred digital embodiment of spot detector.)

While only a few exemplary embodiments of this invention have been described in detail above, those skilled in the art will appreciate that many details of these exemplary embodiments may be varied or modified while yet retaining many of the novel advantages of this invention. Accordingly, all such variations and modifications are intended to be included within the scope of the appended claims.

What is claimed is:

1. Apparatus for detecting and filling-in dead spots in a video signal generated by an array of photo-sensitive elements, said apparatus comprising:
    a sensitivity compensating processor including a digital memory containing stored signals representing an array of pre-stored digital sensitivity correction coefficients corresponding to said array of photo-sensitive elements and sequentially accessed for use in making sensitivity corrections to the video signal generated by said elements;
    a dead spot defect detector means connected to receive the sequentially accessed signals representing the correction coefficients stored in said digital memory and to produce a fill-in enabling signal based on detecting the leading and trailing edges of a dead spot by monitoring, in real time, the succession of accessed coefficient values and by detecting the rate of change in the values of the received sequentially accessed correction coefficients; and
    a dead spot fill-in processor connected to receive said video signal and to substitute thereinto a corrected video signal value which approximates the value that said video signal would have had absent a dead spot in response to said fill-in enabling signal.

2. Apparatus as in claim 1 wherein said sensitivity compensating processor is connected to first receive and first process said video signal and wherein said dead spot fill-in processor is connected to thereafter receive and process the video signal output from the sensitivity compensating processor.

3. Apparatus as in claim 1 wherein said dead spot defect detector means comprises:
    a dead spot edge detecting means responsive to the difference between the values of successive neighboring ones of said correction coefficients in excess of a predetermined threshold value.

4. Apparatus for detecting and filling-in dead spots in a video signal generated by an array of photo-sensitive elements, said apparatus comprising:
    a sensitivity compensating processor including a digital memory containing stored signals representing an array of pre-stored digital sensitivity correction coefficients corresponding to said array of photo-sensitive elements and sequentially accessed for use in making sensitivity corrections to the video signal generated by said elements;
    a dead spot defect detector means connected to receive the sequentially accessed signals representing the correction coefficients stored in said digital memory and to produce a fill-in enabling signal based on detecting the leading and trailing edges of a dead spot by detecting changes in the values of the received sequentially accessed correction coefficients; and
    a dead spot fill-in processor connected to receive said video signal and to substitute thereinto a corrected video signal value in response to said fill-in enabling signal;
    said dead spot detector means including a dead spot edge detecting means responsive to the difference between the values of successive neighboring ones of said correction coefficients in excess of a predetermined threshold value;
    wherein said dead spot edge detecting means comprises:
        leading edge detector means for initiating said fill-in enabling signal in response to the absolute value of said difference exceeding a predetermined threshold magnitude; and
        trailing edge detector means for signaling the termination of said fill-in enabling signal in response to the next detected arithmetic sign reversal in said difference following the initiation of a fill-in enabling signal.

5. Apparatus as in claim 4 wherein said dead spot fill-in processor comprises:
    a video sample-and-hold circuit connected to sample the current value of said video signal in response to the initial occurrence of said fill-in enabling signal and to hold said sampled video signal as its video output signal until the fill-in enabling signal is terminated and to transfer an input video signal to its output without alteration in the absence of said fill-in enabling signal.

6. Apparatus as in claim 4 wherein said dead spot defect detector means further comprises:
    pulse stretcher means for lengthening the time duration of said fill-in enabling signal to ensure that it brackets the time occurrence of the detected dead spot.

7. Apparatus for detecting and filling-in dead spots in a video signal generated by an array of photo-sensitive elements, said apparatus comprising:
- a sensitivity compensating processor including a digital memory containing stored signals representing an array of pre-stored digital sensitivity correction coefficients corresponding to said array of photo-sensitive elements and sequentially accessed for use in making sensitivity corrections to the video signal generated by said elements;
- a dead spot defect detector means connected to receive the sequentially accessed signals representing the correction coefficients stored in said digital memory and to produce a fill-in enabling signal based on detecting the leading and trailing edges of a dead spot by detecting changes in the values of the received sequentially accessed correction coefficients; and
- a dead spot fill-in processor connected to receive said video signal and to substitute thereinto a corrected video signal value in response to said fill-in enabling signal;
- wherein either said dead spot defect detector means or said dead spot fill-in processor includes inhibition means for inhibiting said video signal substitution during a predetermined initial portion of each video line scan.

8. Apparatus for detecting and filling-in dead spots in a video signal generated by an array of photo-sensitive elements, said apparatus comprising:
- a sensitivity compensating processor including a digital memory containing stored signals representing an array of pre-stored digital sensitivity correction coefficients corresponding to said array of photo-sensitive elements and sequentially accessed for use in making sensitivity corrections to the video signal generated by said elements;
- a dead spot defect detector means connected to receive the sequentially accessed signals representing the correction coefficients stored in said digital memory and to produce a fill-in enabling signal based on detecting the leading and trailing edges of a dead spot by detecting changes in the values of the received sequentially accessed correction coefficients; and
- a dead spot fill-in processor connected to receive said video signal and to substitute thereinto a corrected video signal value in response to said fill-in enabling signal;
- wherein either said dead spot defect detector means or said dead spot fill-in processor includes an inhibition means for inhibiting said video signal substitution during a predetermined initial portion of each video frame scan.

9. Apparatus for detecting and filling-in dead spots in a video signal generated by an array of photo-sensitive elements, said apparatus comprising:
- a sensitivity compensating processor including a digital memory containing stored signals representing an array of pre-stored digital sensitivity correction coefficients corresponding to said array of photo-sensitive elements and sequentially accessed for use in making sensitivity corrections to the video signal generated by said elements;
- a dead spot defect detector means connected to receive the sequentially accessed signals representing the correction coefficients stored in said digital memory and to produce a fill-in enabling signal based on detecting the leading and trailing edges of a dead spot by detecting changes in the values of the received sequentially accessed correction coefficients; and
- a dead spot fill-in processor connected to receive said video signal and to substitute thereinto a corrected video signal value in response to said fill-in enabling signal;
- wherein said dead spot fill-in processor further comprises:
- a source of said corrected video signal value; and
  - a video switch connected to transfer said video signal to its output without alteration except during occurrences of said fill-in enabling signal, during which occurrences said corrected video signal value is provided at the switch output.

10. Apparatus as in claim 9 wherein said corrected video signal value represents a local average of pixel values from the video signal being processed in the immediate vicinity of pixel(s) being filled-in.

11. Apparatus as in claim 9 wherein said source of further video signals provides a video signal representing a global average of pixel values from the video signal being processed taken from a predetermined portion of the entire frame of video signals containing the pixel(s) being filled-in and including pixel values outside the immediate vicinity of pixel(s) being filled-in.

12. Method for detecting and filling-in dead spots in a video signal generated by an array of photo-sensitive elements, said method comprising:
- storing signals representing an array of digital sensitivity correction coefficients corresponding to said array of photo-sensitive elements;
- sequentially accessing said stored signals and making sensitivity corrections to the video signal generated by said elements;
- producing a fill-in enabling signal by monitoring, in real time, the succession of accessed coefficient values and by detecting the leading and trailing edges of a dead spot in response to the rate of change in the values of said sequentially accessed correction coefficients; and
- substituting into said video signal a corrected video signal value in response to said fill-in enabling signal which approximates the value that said video signal would have had absent a dead spot.

13. Method as in claim 12 wherein said detected changes in the correction coefficients are detected responsive to the difference between the values of successive neighboring ones of said correction coefficients in excess of a predetermined threshold value.

14. Method for detecting and filling-in dead spots in a video signal generated by an array of photo-sensitive elements, said method comprising:
- storing signals representing an array of digital sensitivity correction coefficients corresponding to said array of photo-sensitive elements,
- sequentially accessing said stored signals and making sensitivity corrections to the video signal generated by said elements;
- producing a fill-in enabling signal by detecting the leading and trailing edges of a dead spot using detected changes in the values of said sequentially accessed correction coefficients; and
- substituting into said video signal a corrected video signal value in response to said fill-in enabling signal;

wherein said detected changes in the correction coefficients are detected responsive to a difference between the values of successive neighboring ones of said correction coefficients in excess of a predetermined threshold value;

wherein said fill-in enabling signal is generated by the steps of:

initiating said fill-in enabling signal in response to the absolute value of said difference exceeding a predetermined threshold magnitude; and determining the termination of said fill-in enabling signal in response to the next detected arithmetic sign reversal in said difference following the initiation of a given fill-in enabling signal.

15. Method as in claim 14 wherein said fill-in enabling signal is also generated by the step of lengthening the time duration of said fill-in enabling signal to ensure that it brackets the time occurrence of the detected dead spot.

16. Method for detecting and filling-in dead spots in a video signal generated by an array of photo-sensitive elements, said method comprising:

storing signals representing an array of digital sensitivity correction coefficients corresponding to said array of photo-sensitive elements, sequentially accessing said stored signals and making sensitivity corrections to the video signal generated by said elements;

producing a fill-in enabling signal by detecting the leading and trailing edges of a dead spot using detected changes in the values of said sequentially accessed correction coefficients; and substituting into said video signal a corrected video signal value in response to said fill-in enabling signal;

inhibiting said video signal substitution during a predetermined initial portion of each video line scan.

17. Method for detecting and filling-in dead spots in a video signal generated by an array of photo-sensitive elements, said method comprising:

storing signals representing an array of digital sensitivity correction coefficients corresponding to said array of photo-sensitive elements, sequentially accessing said stored signals and making sensitivity corrections to the video signal generated by said elements;

also accessing the same said stored signals to produce a fill-in enabling signal by detecting the leading and trailing edges of a dead spot using detected changes in the values of said sequentially accessed correction coefficients; and substituting into said video signal a corrected video signal value in response to said fill-in enabling signal;

inhibiting said video signal substitution during a predetermined initial portion of each video frame scan.

18. Method as in claim 14 or 15 wherein said video signal substitution step comprises sampling the current value of said video signal in response to the initial occurrence of said fill-in enabling signal and holding said sampled video signal as a video output signal until the fill-in enabling signal is terminated.

19. Method for detecting and filling-in dead spots in a video signal generated by an array of photo-sensitive elements, said method comprising:

storing signals representing an array of digital sensitivity correction coefficients corresponding to said array of photo-sensitive elements, sequentially accessing said stored signals and making sensitivity corrections to the video signal generated by said elements;

producing a fill-in enabling signal by detecting the leading and trailing edges of a dead spot using detected changes in the values of said sequentially accessed correction coefficients; and substituting into said video signal a corrected video signal value in response to said fill-in enabling signal;

wherein said video signal substitution step comprises transferring said video signal to a video output without alteration except during occurrences of said fill-in enabling signal during which times said corrected video signal value is provided to the video output.

* * * * *